US009378556B2

(12) United States Patent
Burry (10) Patent No.: US 9,378,556 B2
(45) Date of Patent: Jun. 28, 2016

(54) METHOD FOR REDUCING FALSE OBJECT DETECTION IN STOP-AND-GO SCENARIOS

(71) Applicant: Xerox Corporation, Norwalk, CT (US)

(72) Inventor: Aaron Michael Burry, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 218 days.

(21) Appl. No.: 14/261,510

(22) Filed: Apr. 25, 2014

(65) Prior Publication Data

US 2015/0310628 A1 Oct. 29, 2015

(51) Int. Cl.
G06T 7/20 (2006.01)

(52) U.S. Cl.
CPC ..... *G06T 7/2006* (2013.01); *G06T 2207/10016* (2013.01); *G06T 2207/20081* (2013.01)

(58) Field of Classification Search
None
See application file for complete search history.

(56) References Cited

U.S. PATENT DOCUMENTS

| 6,069,918 | A * | 5/2000 | Meyer | G06K 9/52 348/699 |
| 8,401,230 | B2 | 3/2013 | Kozitsky et al. | |
| 2002/0097893 | A1 * | 7/2002 | Lee | G06F 17/3079 382/103 |
| 2008/0181453 | A1 * | 7/2008 | Xu | G06T 7/2006 382/103 |
| 2009/0315996 | A1 * | 12/2009 | Guler | G01S 3/7864 348/169 |
| 2010/0045799 | A1 * | 2/2010 | Lei | G06K 9/00369 348/169 |
| 2011/0081048 | A1 * | 4/2011 | Woo | G06T 7/2033 382/103 |
| 2012/0177121 | A1 * | 7/2012 | Tripathi | G06T 7/0079 375/240.16 |
| 2013/0141586 | A1 | 6/2013 | Kozitsky et al. | |
| 2015/0279021 | A1 * | 10/2015 | Wu | G06T 3/40 382/103 |

OTHER PUBLICATIONS

U.S. Appl. No. 13/975,245, filed Aug. 23, 2013, Gross, et al.
U.S. Appl. No. 14/022,488, filed Sep. 10, 2013, Loce, et al.
U.S. Appl. No. 14/260,915, filed Apr. 24, 2014, Burry, et al.

* cited by examiner

*Primary Examiner* — Stephen R Koziol
*Assistant Examiner* — Pinalben Patel
(74) *Attorney, Agent, or Firm* — Fay Sharpe LLP (57) ABSTRACT

Video-based object tracking accuracy is improved by a tentative identification of objects to be tracked. An identified blob that does not encompass a previously established set of tracking features ("tracker") triggers initialization of an infant tracker. If that tracker remains the only tracker or becomes the "oldest" tracker associated with a blob identified in subsequent video frames, the "age" of the tracker is increased. If, in subsequent frames, the tracker is encompassed by a blob that is associated with an "older" tracker, the "age" of the tracker is decreased. Infant trackers that reach or exceed a threshold "age" are promoted to adult status. Adult trackers can be processed as being associated with valid objects. Trackers established for blobs identified due to mask segmentation tend not to cause false object detections. When segmentation is corrected, blob segments are combined and redundant trackers for the associated object are demoted and ignored.

18 Claims, 5 Drawing Sheets

METHOD FOR REDUCING FALSE OBJECT DETECTION IN STOP-AND-GO SCENARIOS

BACKGROUND

The presently disclosed embodiments are related to image processing and more particularly to video image processing to track the movement of objects. Embodiments provide improved tracking, especially where the tracked object or objects of interest pause in their movements.

In video analytics applications, it is often desirable to track individual objects as they move through the field of view of the camera. Initially, it is necessary to identify new objects of interest for tracking. A number of methods exist for performing this type of object detection on video frames.

For example, some approaches rely on the use of a model of an image background to help identify new objects in a scene by a process of elimination. However, approaches that use background models (e.g., Gaussian mixture models) of the scene require an initialization period, for instance, to capture the scene without objects of interest and under various lighting and other conditions. The learned background models must also be updated after the initial training period in order to incorporate slow changes in the background scene over time. Additionally, background model-based approaches can require more computational resources than simpler methods.

Frame-to-frame (or temporal) differencing methods use motion information to detect moving objects. Here large changes in pixel values from one frame to the next are indicative of moving foreground objects of interest.

Both model-based and frame-differencing methods for object detection can struggle in scenarios in which the objects of interest undergo frequent stop/start actions within the field of view. The techniques rely at least in part on movement to differentiate between background objects and objects of interest (foreground objects). During pauses in movements, the now non-moving objects tend to fade into the "background" in the view of these adaptive classifications. Accordingly, due to stop and restart events, object detection procedures can be fooled into generating erroneous detections. This can lead to increased computational load through unnecessary processing of additional tracking points. Moreover, in applications where tracking individual objects is critical to automated measurements, these false detections can lead to erroneous measurements. For instance, in a side-by-side drive-thru application where video-based analytics might be used for automated vehicle sequencing to keep track of the relative position of vehicles to aid the delivery of the appropriate drive-thru order, these false detections can lead to reductions in the accuracy.

For each image frame in the input video stream, a foreground pixel mask (or map identifying regions of interest in the image as compared to background portions) is generated. As indicated above, this can be accomplished using a number of methods including, for example, Gaussian mixture model (GMM) based background modeling or frame-to-frame differencing. Background model-based methods such as GMMs are popular because they tend to give robust performance despite extraneous motion within the scene (e.g., tree leaves shaking in the wind). However, they tend to be computationally more expensive than frame-differencing (FD) methods and require an initialization period.

For applications in which the video analysis system might have to function from a "cold start," this initialization requirement can prove difficult. Foreground pixel detection methods based on FD look for moving objects by thresholding differences in pixel values between successive frames in the video sequence. Although they require less computation, FD methods are more susceptible to extraneous motion in the scene and cannot detect stationary objects as foreground.

Both model-based and FD approaches to pixel level foreground detection can struggle with objects that undergo numerous stop/start events within the scene. For FD methods this is readily apparent since the approach relies on detecting change/motion. For model-based methods, stop/start events can also prove troublesome since a stationary object will actually be slowly learned into the background model. As such, one of the difficult design decisions for a model-based object detection method is the choice of the learning rate—too fast and objects blend quickly into the background model; too slow and changes in illumination and slow background movement (e.g., tree leaves) are not well handled by the model.

Figure 1:
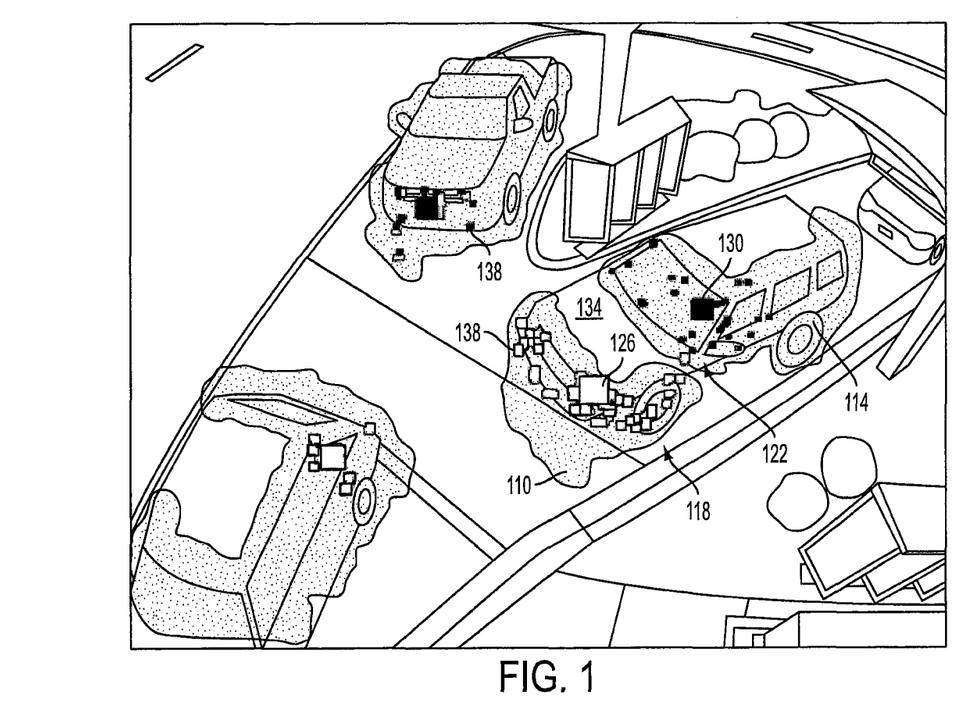
FIG. 1 illustrates blob identification and tracker assignment in a drive thru wherein a vehicle has been stationary.

Given these issues, one challenge for both approaches is that the foreground pixel mask or blob associated with an object undergoing a stop/start cycle can split into several pieces, such as a first segment 110 and a second segment 114, as illustrated in FIG. 1.

Pixels or regions within an image are classified as "foreground" when they are, or are expected to be, components of objects or areas of interest. Identification of foreground pixels can be achieved in a number of ways including: background subtraction, wherein foreground regions are defined as those which differ significantly from the background model, and motion detection. Motion detection approaches typically use either temporal (frame-to-frame) differencing or optical flow methods to identify moving objects in the image frame. The moving objects are considered foreground.

As indicated above, background pixels or regions are, by definition, not foreground. Background may also be defined as typical image content for the scene which remains relatively static (changes slowly) over time. One method for determining background is to build a background model of the scene when there are no objects of interest present. This model then accounts for what is typical of non-foreground content. Note that this model can still account for variability such as the motion of trees in the wind.

A blob as mentioned above and used herein can be, for example, a region of connected components. Connected components are sets of pixels, or regions, in an image all having the same or similar (depending on the application) pixel values and wherein the pixels in the set are connected to one another. Here connection refers to the ability to traverse from any pixel in the set to any other pixel in the set via neighbor pixels that are also contained in the set. Neighbor pixels are adjacent pixels to a given pixel.

The over segmentation of image objects caused by the reaction of object tracking video processing techniques to pauses in object motion can affect the subsequent detection of new objects based on the foreground pixel mask. More specifically, with reference to FIG. 1, a first set 118 and second set 122 of marked tracking features and tracker centroids (large squares 126, 130) are identified for a vehicle 134. These tracking features were grouped as separate trackers 118, 122 due to a segmentation of an object blob (see 210 of FIG. 2) associated with the vehicle 134 into the first 110 and second 114 segments and subsequent resulting classification of vehicle portions as separate vehicles or objects of interest. Such a misclassification can have an effect on the subsequent measurement of vehicle sequence as the cars merge into a single lane, since the vehicle 134 will be interpreted as multiple merge events due to the two associated trackers 118, 122.

Tracking features or attributes are aspects of an image object that are used to follow the object as it moves in the scene. There are many different kinds of features used in video tracking. The types of features used depend on the method used for tracking the features from frame-to-frame in the video stream. Examples of common features include: scale invariant features such as scale invariant feature transform (SIFT) features or speeded up robust features (SURF), interesting points such as Harris corner features, maximally stable extremal region (MSER) features, color or grayscale histograms, shape features of the target object blob such as area, orientation, aspect ratio, contour, and template images of the objects of interest or one or more sub-regions of the object of interest.

An object tracker is a set of tracking features associated with an object of interest which are associated with a corresponding method for following these features from frame-to-frame in a video stream. Based on the location of the features for the current frame, the tracker typically also maintains an overall estimate of the pixel location of the object in the image frame. This can be accomplished, for instance, with a centroid of the positions of the individual feature points. Tracking points are pixel locations of individual tracked features for a given tracker.

A method to address the "over-segmentation" of moving foreground blobs in object detection is to apply a threshold on the number of sightings before a new object is considered "real." Typically, this thresholding would be performed within a region of interest in the scene where new objects tend to appear. For instance, in an application for monitoring highway traffic, the lanes of interest tend to be unidirectional. In other words, objects enter the scene near the bottom/top and exit near the top/bottom. Thus, the region of interest for detecting new objects is fixed. Likewise in a drive-thru monitoring scenario, the order entry points can be fixed regions of the scene where new vehicle detections can be expected. By looking for the occurrence of foreground blobs in these regions, new trackers can be assigned only when blobs are detected in the region of interest a minimum number of times.

However, for scenarios like a tightly packed drive-thru, the objects of interest (e.g., people, vehicles) can undergo many stop/start events and can move at highly variable speeds through the scene. This presents a challenge to existing methods for object detection due to the occurrence of many pause-in-motion generated "over-segmentations." Existing threshold-of-occurrence-based methods do not provide sufficient accuracy for such high stress object tracking applications.

BRIEF DESCRIPTION

A video image processing method for tracking objects can include receiving a video image frame including video data and updating locations of existing object trackers based on the received video data, identifying regions in the video image that qualify as object detection blobs based on the video data and blob classification rules. Additionally, for each identified object detection blob, the method can include determining, if an existing tracker is associated with a location within the blob region, increasing an age or importance parameter value of any infant tracker that is the only tracker determined to be associated with the object detection blob, increasing an age or importance parameter value of any infant tracker that is the oldest infant tracker or is associated with the highest valued importance parameter among a plurality of infant trackers that are associated with the object detection blob, if the object detection blob is not associated with an existing adult tracker, initializing an infant tracker for each identified object detection blob region that is not associated with at least one existing tracker, decreasing the age or importance parameter value of any infant tracker associated with a location within the blob region that is also associated with an adult tracker or is also associated with at least one infant tracker having an older age or greater importance parameter value than the infant tracker, and promoting to adult tracker status any infant tracker having an age above a threshold age.

For example, adult trackers can be further processed as being associated with a validated tracked object.

A video image processing apparatus for tracking objects according to embodiments of such methods can include at least one processor configured as a video image receiver, a tracker updater, a blob identifier and a blob processor.

For instance the video image receiver can be operative to receive a video image frame including video data. For example, the image frame can be received from a camera, from a video recording device or from video production equipment, such as an animation tool.

The tracker updater can be operative to update the locations of any existing object trackers based on the received video data.

The blob identifier can be operative to identify regions in the video image that qualify as object detection blobs based on the video data and blob classification rules.

For each object detection blob identified by the blob identifier, the blob processor can be operative to determine if an existing tracker is associated with a location within the blob region, increase an age or importance parameter value of any infant tracker that is the only tracker determined to be associated with an object detection blob, increase an age or importance parameter value of any infant tracker that is the oldest infant tracker or is associated with the highest valued importance parameter among a plurality of infant trackers that are associated with the object detection blob, if the object detection blob is not associated with an existing adult tracker, initialize an infant tracker for each identified object detection blob region that is not associated with at least one existing tracker, decrease the age or importance parameter value of any infant tracker associated with a location within the blob region that is also associated with an adult tracker or is also associated with at least one infant tracker having an older age or greater importance parameter value than the infant tracker, and to promote to adult tracker status any infant tracker having an age above a threshold age.

DETAILED DESCRIPTION

The presently described embodiments provide a system for improving object detection accuracy, particularly for scenarios in which the objects of interest undergo at least a single stop/start as they move throughout the scene. This is accomplished using a multi-level scheme (infant/adult) for determining which detections are valid (adult) and which are likely to be false detections (infants that never mature). For each processed frame, foreground blobs for the present frame are evaluated in conjunction with current locations of existing trackers. Foreground blobs without an existing tracker are initialized with "infant" trackers. In subsequent sightings, the "ages" or an importance parameter value for infant trackers are increased when the infant trackers occur in their own distinct foreground blobs. New (infant) trackers are more likely to be associated with valid new object detections when they are the only trackers associated with a blob. Conversely, any frame in which an infant tracker is found within a foreground blob that contains other trackers (infant or adult), a process of demotion occurs. That is, when multiple trackers are associated with a blob, the younger tracker is likely invalid or duplicative of earlier established trackers. Accordingly, the "age" of such infant trackers is decreased. Accordingly, there can be two parameters, an increase or promotion rate Rp and a decrease or demotion rate Rd, which can set the rate at which ages are increased and decreased and need not be the same. In some embodiments the demotion rate exceeds that of the promotion rate. For example, in some embodiments, when the age of an infant tracker is increased, it is increased by an amount of one and when the age of an infant tracker is decreased, it is decreased by an amount of two. Other increase/decrease amounts are contemplated as are increase/decrease ratios other than the one/two ratio mentioned here.

As the updating of the infant trackers continues, any infant tracker whose age exceeds a threshold (Tpromote) is promoted to be an "adult" tracker or to have an adult tracker status. Only adult trackers are considered valid, active trackers for the purposes of the higher level tracking application (e.g., drive-thru sequencing via tracking of vehicles). That is, only image regions associated with adult trackers are considered to be of valid objects of interest. For example, in some embodiments, for instance in embodiments where the age or importance parameter value is increase by about one and decreased by about two, a threshold for promoting an infant tracker to an adult tracker of about four to about six is expected to provide good results. However, other threshold values and/or threshold ratios other than the threshold/increase amount ratio of about four to about six mentioned here may be desirable in some applications or embodiments.

In embodiments, when multiple infant trackers are found within the same foreground blob (without any adult trackers present in the same blob), an "age" or importance parameter of the "oldest" infant tracker is increased while the "ages" or importance parameter of all infant trackers are decreased. This gives preference to the tracker that was first initialized on or for the associated object.

An example scenario in which embodiments might be beneficially applied is where there is the slow stop/start movement of a vehicle exiting an order-entry zone in a drive-thru. As indicated above, the pauses in the start/stop progress of the vehicles can cause multiple distinct foreground blob regions to be associated with a single vehicle across a number of video frames. This creates the situation referenced above in regard to FIG. 1. With regard to, for example, FIG. 1, it is noted small squares (e.g., 138) identify the locations of individual tracking points (e.g., Harris corner features or other tracking features) and larger squares (e.g., 130) indicate the resultant centroid used to estimate the location of the tracked vehicle. Also, note that different shading identifies different sets of tracking features comprising different trackers. In the example of FIG. 1 (and FIG. 2), the first tracker 118 is an adult tracker and the second tracker 122 is an infant tracker.

In this example, the original detection on the front of the vehicle 134 has already been promoted from infant tracker to adult tracker 118 as the vehicle started to move out of the order entry zone. As other portions of the vehicle came into view, an additional foreground blob occurred and the second 122 infant tracker was initialized for association with the area of the windshield and driver's door.

Figure 2:
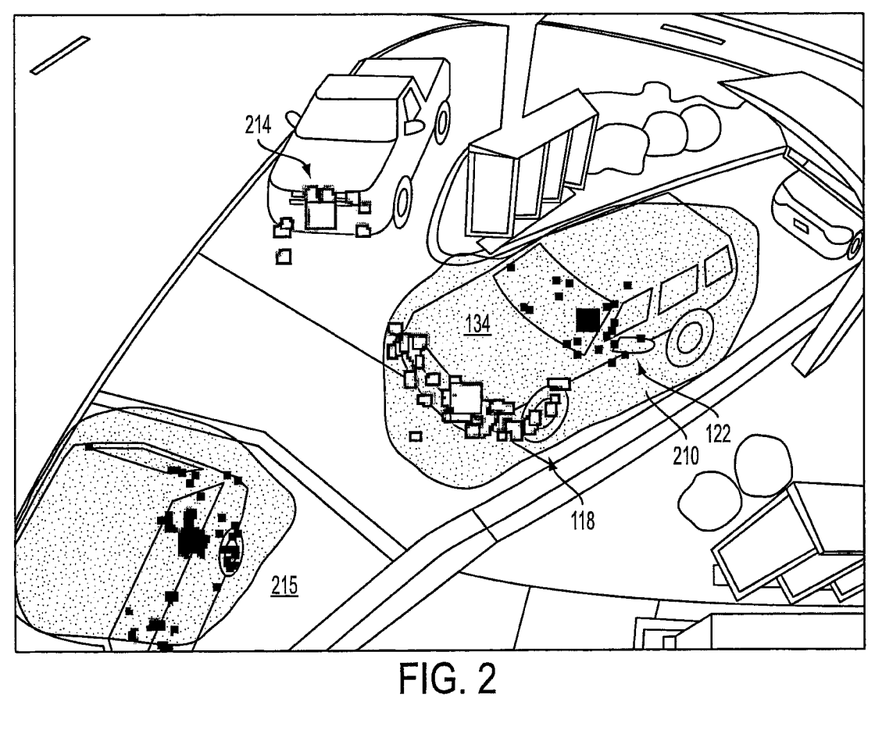
FIG. 2 illustrates blob identification and tracker assignment in a drive thru wherein a vehicle has been in motion.

Following this vehicle forward, a number of frames to the stage illustrated in FIG. 2, one can see that the motion of the vehicle has increased thereby causing the individual foreground blobs 110, 114 to merge into a single blob 210. At this point, the infant tracker 122 starts to be demoted in age or importance as it is now included in a blob 210 that includes an "older" or "more important" (in this case an adult) tracker, adult tracker 118. This demotion will continue as the vehicle moves through the scene as long as the infant tracker 122 is encompassed by a blob that also includes the adult tracker 118. As a result, the infant tracker 122 never gets promoted to an active, adult tracker and is prevented from generating an erroneous merge event as the vehicle 134 moves into the single lane of traffic 215. In this way, embodiments avoid false object detections and related error generation in the post-merge vehicle sequence determined by the overall tracking system.

The present method was tested on one week of video footage of a drive-thru scenario from a real drive-thru. This footage included morning, noon, evening, and late night traffic and related changes in lighting conditions. In addition, multiple weather conditions were observed (cloudy, rainy, and sunny). Applying the tested embodiment increased the accuracy of the automated tracking system by more than 10% as compared to the baseline object detection method (standard frame differencing).

In some embodiments, "adult" trackers can be initialized independent of their associated infants. However, in other embodiments or applications, it may be beneficial to simply carry over the selected tracking features from the infant tracker. Alternate embodiments may include selecting a subset of the features from the infant tracker for tracking in the adult stage. For instance, the type of features used in the infant and adult tracking phases don't have to be the same. In some embodiments, the tracking method used in the infant and adult stages is different. For instance, switching the tracking features and/or method that comprise infant and adult trackers in this fashion can be beneficial in applications in which the objects of interest are expected to exhibit different behaviors nearer the initial object detection versus long-term tracking. These behavior changes could include: speed of motion, angle of orientation (or pose), consistency of speed, consistency of angle of orientation (or pose), etc. Any initializations of adult trackers are considered herein to be examples of promoting an infant tracker to adult status.

Figure 3:
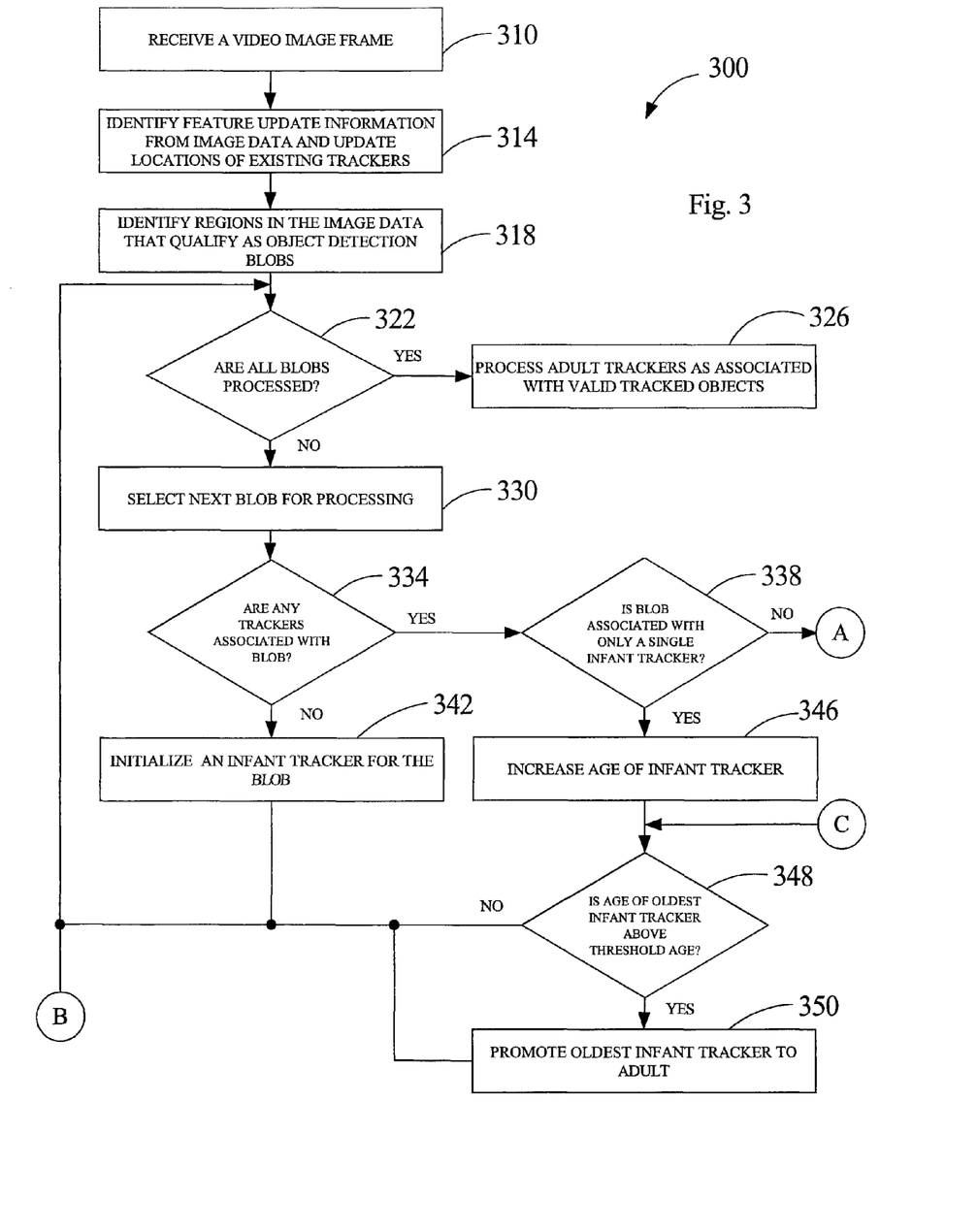
FIG. 3 and FIG. 4 are a flow chart outlining embodiments of a video image processing method.
Figure 4:
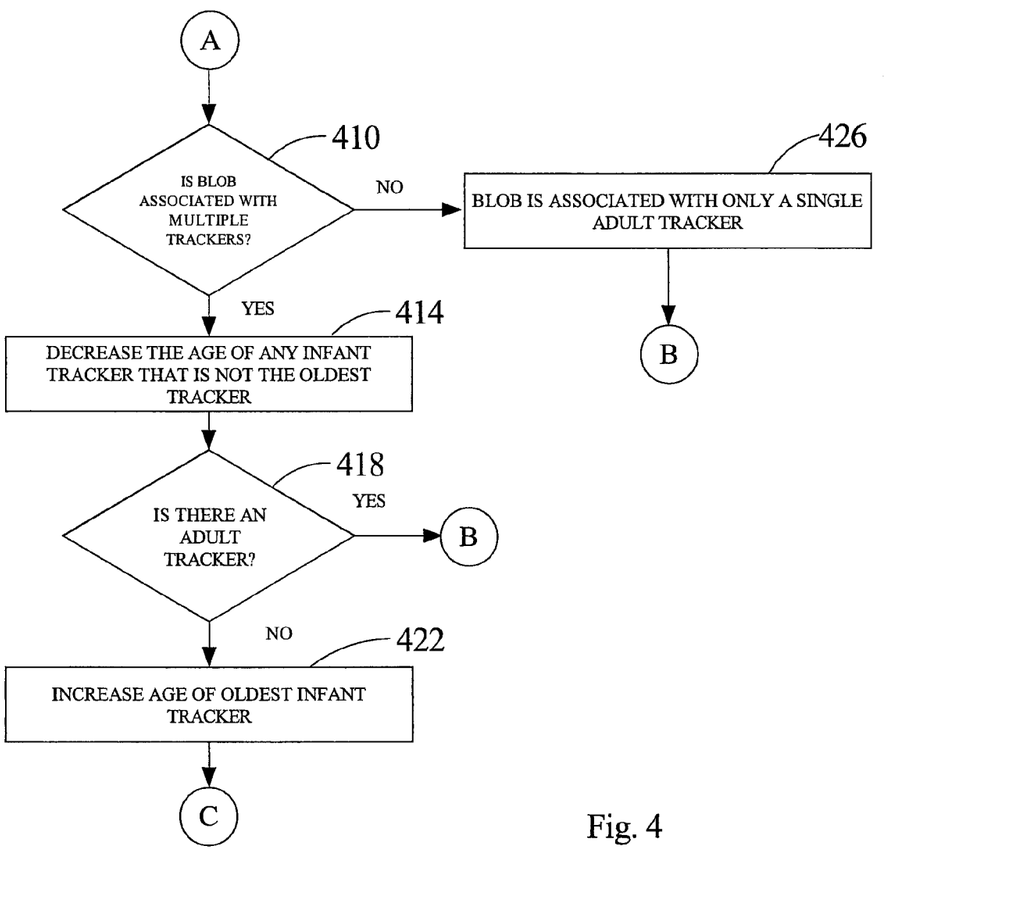

With reference to FIGS. 3 and 4, a video image processing method 300 for tracking objects can include receiving 310 a video image frame including video data, updating 314 the locations of any existing object trackers based on the received video data, identifying 318 regions in the video image that qualify as object detection blobs based on the video data and blob classification rules, and for each identified object detection blob: determining (e.g., 334, 338 and 410), if an existing tracker is associated with a location within the blob region, increasing 346 an age or importance parameter value of any infant tracker that is the only tracker determined to be associated with the object detection blob, increasing 422 an age or importance parameter value of any infant tracker that is the oldest infant tracker or is associated with the highest valued importance parameter among a plurality of infant trackers that are associated with the object detection blob, if the object detection blob is not associated with an adult tracker, initializing 342 an infant tracker and decreasing 414 the age or importance parameter value of any infant tracker associated with a location within the blob region that is also associated with an adult tracker or is also associated with at least one infant tracker having an older age or greater importance parameter value than the infant tracker. Additionally, the method includes promoting 350 to adult tracker status any infant tracker determined 348 to have an age above a threshold age. In some embodiments, each adult tracker can then be processed 326 as being associated with a validated object of interest. For instance, adult trackers can be used in further tracking and decision making.

Receiving 310 a video image frame including video data can include receiving video signals from a video camera. The video can be received directly from a camera or camera system where live real time processing is being performed. Alternatively, video data can be received from a recording and/or playback device where the processing is being done after the fact. The video can be of a drive-thru, as in the example discussed above, or of any other application where it is desired to track objects. For example, embodiments might be employed in a factory, bottling plant or cannery where it is desired to track manufacture items or packages. Alternatively, surveillance video might be processed after the fact to aid a crime investigation.

Updating 314 the locations of existing object trackers based on the received video data can include performing video data analysis including object identification and tracking techniques. Such techniques include background subtraction (or background model-based detection) and frame differencing. Object detection can also be performed using image-based classification—for instance, using a face detector to identify faces in the image frame for subsequent tracking. In some cases, the model-based or frame-differencing approaches can be combined with image-based classification. Here the classifier might serve as a "validation" of the detected objects prior to initiation of tracking. For example, trackable features in the foreground are identified. For instance, scale invariant features such as scale invariant feature transform (SIFT) features or speeded up robust features (SURF), interesting points such as Harris corner features, maximally stable extremal region (MSER) features, color or grayscale histograms, shape features of the target object blob: area, orientation, aspect ratio, contour might be identified. Where a feature is similar (e.g., of a same type and located within an anticipated distance) to a previously identified feature associated with a previously processed frame, it is assumed that the currently identified feature is the same feature as the previously identified feature, and recorded information about that feature, such as the location and descriptive parameters, is updated 314.

Identifying 318 regions in the video image that qualify as object detection blobs can include processing the image data against blob identification rules. For instance, a search is conducted in the image data for regions having sets of pixels all having a same pixel value or pixel values within a defined range of one another and wherein the pixels in the set are adjacent to one another. Such sets are classified as blobs. It is assumed that a blob is associated with an object of interest. Blob identification rules can also include measuring key features of the blobs such as area, shape, orientation, etc., and using these measurements to determine which blobs are likely valid candidates for further processing.

The updated 314 trackers are reviewed in light of the identified 318 blobs. For instance, the locations of features (e.g., 138) that make up the trackers (e.g., 118, 122) are compared to the boundary associated with each blob (e.g., 110, 114, 210). If the majority of the tracking features, or alternatively, the centroid locations of the tracked features, for the trackers (e.g., 118, 122) are located within the boundary associated with a blob, then the trackers are considered to be associated with that blob. Each identified 318 blob is considered (322, 330).

If 334 there are no existing trackers associated with a blob, a new trackable object may have been identified. Trackable features within the region of the blob are identified and an infant tracker based on those features is initialized 342 and processing returns to determine if 322 all the identified 318 blobs have been identified.

It is assumed that the blob includes at least some trackable features. In this regard, it is noted that at least some tracking point tracking features such as Harris corners, SIFT and SURF provide some measure of the "strength" of the individual features. If necessary, a threshold "strength" associated with tracker identification can be temporarily lowered if it is difficult to find trackable features within the blob. Additionally, or alternatively, a reduced number of features might be accepted as the basis for a tracker wherein only those features that meet certain criteria or have the highest "strength" score are accepted. Where some features are very strong, the number of required features might be reduced. If all else fails, as noted above, aspects/parameters of the blob itself can be used as trackable features. Alternatively, in some embodiments, an inability to find trackable features can be interpreted as a reason to classify the blob as a false detection (not illustrated in FIGS. 3 and 4) and so an infant tracker might not be assigned.

Determining if an existing tracker is associated with a location within the blob region can include determining if a centroid of a set of tracking features judged to correspond to a set of tracking features identified in a previously processed image is within a boundary of the blob region. Alternatively, determining if an existing tracker is associated with a location within the blob can include determining if a selected number of tracking features of a set of tracking features judged to correspond to a set of features identified in a previously processed image are within the boundary of the blob region, determining if a selected percentage of tracking features of a set of tracking features judged to correspond to a set of features identified in the previously processed image are within the boundary of the blob region. In an additional alternative, determining if an existing tracker is associated with a location within the blob can include determining if a set of tracking features associated with the blob correspond to a set of features identified in a previously processed image.

If 338 a blob is associated with only a single infant tracker, then the age or importance parameter value associated with that single infant tracker is increased 346. As indicated above, the amount of the increase can be determined on an application-by-application basis and is, in effect, a tuning parameter that controls how quickly an infant is promoted 350 to adult tracker (e.g., 118) status. That is, if 348 the age or importance parameter value of the infant tracker is at or above a selected age or importance threshold, then an adult tracker is initialized. This threshold can also be considered to be a tuning parameter that has a bearing on how quickly an infant tracker is promoted 350 to adult status.

The promotion 350 can involve simply changing the status of the infant tracker to adult. Alternatively, a new adult tracker can be initialized based on some or all or different tracking features than were the basis of the infant tracker. For instance, changing the tracking features and/or method of identifying tracking features can provide benefits in applications in which the objects of interest are expected to exhibit different behaviors at different positions within the tracking field of view or fields of view. For instance, different tracking techniques/features may provide improved accuracy when the speeds of motion, angle of orientation, speed consistency and/or angle of orientation vary between positions. The position at which it is anticipated that objects associated with infant trackers will be when the respective objects' infant trackers are promoted 352 to adulthood can be associated with a change in these aspects. Therefore, it may be appropriate to use different tracable features after tracker transition to adulthood. We refer to changing the status of a tracker from infant to adult or replacing an infant tracker with an adult tracker having different or similar features as promoting 350 an infant tracker to adult status. By way of example, it is noted that a third tracker 214 identified in FIG. 2 illustrates a promotion of an infant tracker to adult status by the difference in shading of the tracker 214 compared to the shading of the related trackers in FIG. 1.

As is illustrated in FIG. 2, it is possible for a blob (e.g., 210) to be associated with a plurality of trackers (e.g., 118, 122). If 410 a blob is associated with multiple trackers, the age of any infant tracker that is not the oldest tracker is decreased 414. If there is an adult tracker associated with the blob, then it is the oldest tracker and all the infant trackers are demoted or have their age or importance parameter value decreased. In this way, extra or redundant trackers are prevented from maturing into adults and being misinterpreted as objects of interest. As indicated above, the amount by which the age or importance parameter value is decreased can be a mechanism for tuning the system. For instance, the rate or the amount by which the importance of a tracker is decreased can be higher (or lower) than the amount or rate at which the age of infant trackers is increased. For example, in some embodiments, when the age or importance parameter value of an infant tracker is increased, it is increased by an amount of one, and when the age or importance parameter value of an infant tracker is decreased, it is decreased by an amount of two.

If 418 the plurality or set of multiple trackers associated with the blob does not include an adult tracker, then the age of the oldest infant tracker is increased 422. The age or importance parameter value of the oldest infant tracker is compared to a threshold age or importance parameter value and if 348 it is above (or equal to, depending on implementation) the threshold value, the infant tracker is promoted 350 to adult status as previously described.

If 418 the plurality of trackers associated with the blob does include an adult tracker, then the processing of the current blob is completed without changing the age or importance of an infant tracker and without testing the age or importance value against the threshold. Processing attention is directed toward selecting a next 330 blob for processing, if 322 there is a next blob.

If 410 there are not multiple trackers associated with the blob, and if 338 there is not only one single infant tracker associated with the blob, and if 334 it is not the case that there are no trackers associated with the blob, then it must be that there is a single adult tracker associated with the blob. In that case, the processing of the blob is completed and attention is directed to selecting 330 a next blob for processing, if 322 there is a next blob.

When it is determined 322 that all the identified 318 blobs have been processed, information regarding the adult trackers can be passed on to, for example, an overall tracking process and the adult trackers are processed 326 under the assumption that they are associated with valid objects of interest, i.e., objects to be tracked.

Figure 5:
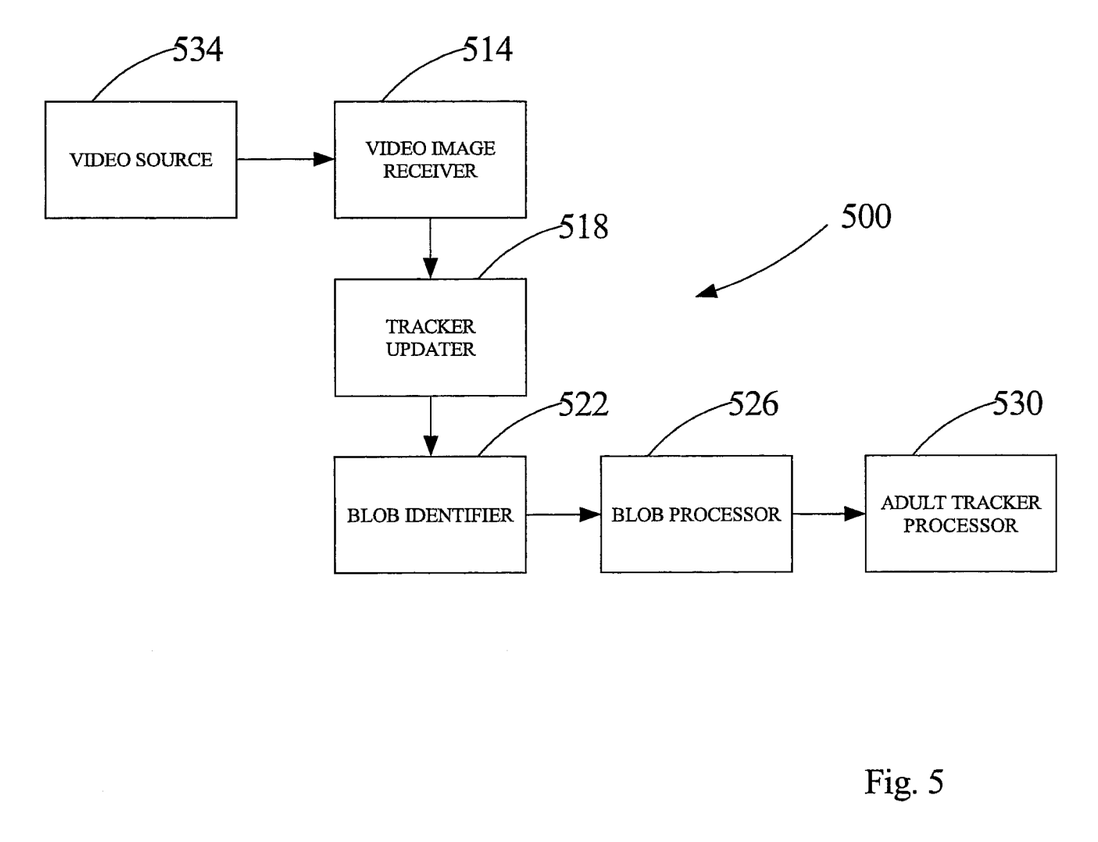
FIG. 5 is a block diagram of a system that can be configured to perform embodiments of the method of FIGS. 3 and 4.

Referring to FIG. 5, a video image processing apparatus 500 for tracking objects according to the method outlined above and with regard to FIGS. 3 and 4 can include, for example, at least one processor configured as a video image receiver 514, a tracker updater 518, a blob identifier 522, a blob processor 526 and an adult tracker processor 530.

The video image receiver 514 of the apparatus 500 can receive video image data from, for example, a video source 534. For instance, the video source 534 may be a video camera or a video information recording device. Alternatively, the video source may be any other device that produces a series of images including, but not limited to, an animation tool or a device for converting film-based images to electronic images. The video image receiver 514 may include an image memory for storage of image data and may provide image data to other system components or aspects such as, for example, the tracker updater 518, blob identifier 522 and/or the blob processor 526. Alternatively, system elements may process the data sequentially and pass data from one system element or functional block to another. Still further, the video data may reside in one location and be accessed by system elements as needed.

The tracker updater 518 updates 314 the locations of existing object trackers based on the received video data. For instance, video data analysis is performed including object tracker identification. Existing object trackers are object trackers that were initialized during the processing of earlier video frames and/or that were maintained or updated based on data from earlier video frames. For instance, embodiments of the tracker updater 518 may apply background subtraction and or frame differencing to identify foreground objects. Some embodiments use image-based classification such as a face detector for identifying faces. Some embodiments apply a combination of techniques. For instance, a model-based or frame-differencing technique is applied to identify potential foreground objects, and an image classifier is used to judge whether the potential foreground objects are to be considered valid detected objects. As indicated above, SIFT, SURF, MSER, grayscale histograms, shape features, area, orientation, aspect ratios and contours may be identified as trackable features. Where a feature is similar (e.g., of a same type and located within an anticipated distance) to a previously identified feature associated with a previously processed frame, it is assumed that the currently identified feature is the same feature as the previously identified feature, and information about that feature, such as location and descriptive parameters, is updated 314 by the tracker updater 518.

The blob identifier 522 identifies 318 regions in the video image that qualify as object detection blobs. For instance, the blob identifier 522 can process the image data against blob identification rules. For instance, a search is conducted in the image data for regions having sets of pixels all having a same pixel value or pixel values within a defined range of one another and wherein the pixels in the set are adjacent to one another. Such sets are classified as blobs. If the pixels are foreground pixels, it is assumed that the blob is associated with an object of interest.

The blob processor 526 reviews the trackers updated 314 by the tracker updater 518 in light of the blobs identified 318 by the blob identifier 522. For instance, the locations of features (e.g., 138) that make up the trackers (e.g., 118, 122) are compared by the blob processor 526 to a boundary associated with each blob (e.g., 110, 114, 210). If the trackers (e.g., 118, 122) are located within the boundary associated with a blob, then the trackers are associated with that blob. Each identified 318 blob is considered (322, 330).

If 334 there are no existing trackers associated with the blob, a new trackable object may have been identified by the blob identifier 522. The blob processor 526 identifies trackable features within the region of the blob and an infant tracker based on those features is initialized 342 by the blob processor 526. It is assumed that the blob includes at least some trackable features. As indicated above, at least some tracking point tracking features such as Harris corners, SIFT and SURF provide some measure of the "strength" of the individual features. If necessary, a threshold "strength" associated with tracker identification can be temporarily lowered by the blob processor 526 if it is difficult to find trackable features within the blob. Additionally, or alternatively, the blob processor 526 can select a reduced number of features as the basis for a an newly initialized 342 infant tracker wherein only those features that meet certain criteria or have the highest "strength" score are accepted. Where some features are very strong, the blob processor 526 might reduce the number of required features for establishing an infant tracker. As indicated above, if all else fails, aspects of the blob itself can be used as trackable features. However, in some embodiments, the blob processor 526 might interpret an inability to find trackable features associated with the blob as a reason to classify the blob as a false detection and the blob processor 526 might not initialize an infant tracker for that blob.

If 338 a blob is associated with only a single infant tracker, then the blob processor 526 increases 345 the age or an importance parameter value associated with that single infant tracker. In some embodiments, the blob processor 526 can be configured through selection of an increase amount and the amount of the increase can be determined on an application-by-application basis. This tuning parameter can control how quickly an infant is promoted 350 to adult tracker (e.g., 118) status. That is, if 348 the age or importance parameter value of the infant tracker is above a selected age or importance threshold, then the blob processor initializes an adult tracker. This threshold can also be considered to be a tuning parameter that has a bearing on how quickly an infant tracker is promoted 350 to adult status. The promotion 350 can involve simply changing the status of the infant tracker to adult. Alternatively, a new adult tracker can be initialized based on some, all, or different tracking features that were the basis of the infant tracker.

If 410 a blob is associated with multiple trackers, then the blob processor 526 decreases 414 the age of any infant tracker that is not the oldest tracker. If there is an adult tracker associated with the blob, then it is the oldest tracker and all of the infant trackers are demoted or have their age or importance parameter decreased. In this way, extra or redundant trackers are prevented from maturing into adult trackers and the system is kept from tracking falsely identified objects. In some embodiments, the blob processor 526 can be configured so that the amount by which the age or importance parameter value is decreased can be selected or changed. For instance, the rate or the amount by which the age or importance of a tracker is decreased can be higher (or lower) than the amount or rate at which the age or importance of infant trackers is increased.

If 418 the plurality or set of multiple trackers associated with the blob does not include an adult tracker, then the blob processor 526 increases 422 the age of the oldest infant tracker. The age or importance parameter value of the oldest infant tracker is compared to a threshold age or importance parameter value and, if 348 it is above (or equal to, depending on implementation) the threshold value, the blob processor 526 promotes 350 the infant tracker to adult status. If 418 the plurality of trackers associated with the blob does include an adult tracker, then the blob processor 526 determines that processing of the current blob is complete and does not increase the age or importance of an infant and does not test the age or importance value of an infant tracker against the adulthood threshold. Instead, processing attention to selecting a next 330 blob for processing, if 322 there is a next blob.

Additionally, in the case that there is only a single adult tracker associated with a blob (426), the blob processor 526 determines that the processing of the blob is completed and directs processing attention to selecting 330 a next blob for processing, if 322 there is a next blob.

When the blob processor 526 determines 322 that all the blobs identified 318 by the blob identifier 522 have been processed, information regarding the adult trackers can be passed on to a next stage. For example, information regarding the adult trackers can be passed to, or made available to, an adult tracker processor 530 which can process the adult trackers or objects associated therewith under the assumption that they are associated with valid objects of interest, e.g., objects to be tracked.

The at least one processor can be any computational element or elements and configuration can be achieved by providing the computational element(s) with access to appropriate processing instructions or by providing connections to appropriate configuring circuitry. For instance a computational element can include a microprocessor, computer, digital signal processor, field programmable gate array (FPGA), application specific integrated circuit (ASIC), or microcontroller. Instructions can be provided in machine readable media, such as memory devices and/or media, such as rotatable media such as optical disks or magnetic disks or tapes. Configuring circuitry can be provided through known techniques for programming FPGA and designing ASICS.

It is to be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A video image processing method for tracking objects, the method comprising:
   receiving a video image frame including video data;
   updating a location of at least one existing infant or adult object tracker, if processing at least one previous video image frame resulted in the previous establishment and current existence of at least one infant or adult object tracker, the updating of the location being based on the received video data;
   identifying regions in the video image that qualify as object detection blobs based on the video data and blob classification rules;
   for each identified object detection blob:
   determining if an existing tracker is associated with a location within the blob region;
   increasing an age or importance parameter value of any existing infant tracker that is the only tracker determined to be associated with a location within the object detection blob region;
   increasing an age or importance parameter value of any existing infant tracker that is the oldest infant tracker or is associated with the highest valued importance parameter among a plurality of existing infant trackers that are associated with a location within the object detection blob region, if the object detection blob is not associated with an existing adult tracker;
   initializing an infant tracker for each identified object detection blob region that is not associated with at least one existing tracker;

decreasing the age or importance parameter value of any existing infant tracker associated with a location within the object detection blob region wherein the object detection blob region is also associated with an existing adult tracker or is also associated with at least one existing infant tracker having an older age or greater importance parameter value than the existing infant tracker under consideration; and promoting to adult tracker status any existing infant tracker having an age or importance parameter value above a threshold age or importance parameter value.

2. The method of claim 1 further comprising:
processing each adult tracker as being associated with a validated tracked object.

3. The method of claim 1 wherein when the age or importance parameter value of an infant tracker is increased, the age or importance parameter value is increased by an amount that is less than an amount by which the age or importance parameter value is decreased when the age or importance parameter value is decreased.

4. The method of claim 1 wherein when the age or importance parameter value of an infant tracker is increased, the age or importance parameter value is increased by an amount of one and when the age or importance parameter value is decreased, the age or importance parameter value is decreased by an amount of two.

5. The method of claim 4 wherein the threshold age or importance value is selected from a range of about four to about six.

6. The method of claim 1 wherein when the age or importance parameter value of an infant tracker is increased, the age or importance parameter value is increased by an amount that is about half as large as an amount by which the age or importance parameter value is decreased when the age or importance parameter value is decreased.

7. The method of claim 6 wherein the threshold age or importance value is selected from a range of about four times to about six times the amount that the age or importance parameter value is increased when the age or importance parameter value is increased.

8. The method of claim 1 wherein updating a location of at least one existing object tracker comprises updating the location of at least one of: a scale invariant feature, a scale invariant feature transform (SIFT) feature, a speeded up robust feature (SURF), a Harris corner feature, a maximally stable extremal region (MSER) feature, a color histogram, a gray-scale histogram, a shape feature of the blob, an area of the blob, an orientation of the blob, an aspect ratio of the blob and a contour of the blob.

9. The method of claim 1 wherein determining if an existing tracker is associated with a location within the blob region comprises at least one of:
determining if a centroid of a set of tracking features judged to correspond to a set of tracking features identified in a previously processed image frame is within a boundary of the blob region;
determining if a selected number of tracking features of a set of tracking features judged to correspond to a set of features identified in a previously processed image frame are within a boundary of the blob region;
determining if a selected percentage of tracking features of a set of tracking features judged to correspond to a set of features identified in a previously processed image frame are within a boundary of the blob region; and
determining if a set of tracking features associated with the blob correspond to a set of features identified in a previously processed image frame.

10. A video image processing apparatus for tracking objects, the apparatus comprising:
at least one processor configure as:
a video image receiver that is operative to receive a video image frame including video data;
a tracker updater that is operative to update a location of at least one existing infant or adult object tracker, if processing at least one previous video image frame resulted in the previous establishment and current existence of at least on infant or adult object tracker, the updating of the location being based on the received video data;
a blob identifier that is operative to identify regions in the video image that qualify as object detection blobs based on the video data and blob classification rules;
a blob processor that is operative to:
for each object detection blob identified by the blob identifier:
determine if an existing tracker is associated with a location within the blob region;
increase an age or importance parameter value of any existing infant tracker that is the only tracker determined to be associated with a location within the object detection blob region;
increase an age or importance parameter value of any existing infant tracker that is the oldest infant tracker or is associated with the highest valued importance parameter among a plurality of existing infant trackers that are associated with a location within the object detection blob region, if the object detection blob is not associated with an existing adult tracker;
initialize an infant tracker for each identified object detection blob region that is not associated with at least one existing tracker;
decrease the age or importance parameter value of any existing infant tracker associated with a location within the object detection blob region wherein the object detection blob region is also associated with an existing adult tracker or is also associated with at least one existing infant tracker having an older age or greater importance parameter value than the infant tracker under consideration; and
promote to adult tracker status any existing infant tracker having an age above a threshold age.

11. The video image processing apparatus of claim 10 wherein the at least one processor is configured as:
an adult tracker processor that is operative to process each adult tracker as being associated with a validated tracked object.

12. The video image processing apparatus of claim 10 wherein when the blob processor increases the age or importance parameter value of an infant tracker, the age or importance parameter value is increased by an amount that is less than an amount by which the blob processor decreases the age or importance parameter when the age or importance parameter value is decreased.

13. The video image processing apparatus of claim 10 wherein when the blob processor increases the age or importance parameter value of an infant tracker, the age or importance parameter value is increased by an amount of about one and when the blob processor decreases the age or importance parameter value, the age or importance parameter value is decreased by an amount of about two.

14. The video image processing apparatus of claim 13 wherein when the blob processor compares the age or importance parameter value of the infant tracker to the threshold age or importance value, the threshold age or importance value is selected from a range of about four to about six.

15. The video image processing apparatus of claim 10 wherein when the blob processor increases the age or importance parameter value of an infant tracker, the blob processor increases the age or importance parameter value by an amount that is about half as large as an amount by which the blob processor decreases the age or importance parameter value when the blob processor decreases age or importance parameter value.

16. The video image processing apparatus of claim 15 wherein when the blob processor compares the age or importance parameter value of an infant tracker to the threshold age or importance value, the blob processor uses a threshold value that is selected from a range of about four times to about six times the amount by which the blob processor increases the age or importance parameter value, when the blob processor increases the age or importance parameter value.

17. The video image processing apparatus of claim 10 wherein the tracker updater is operative to update a location of at least one existing object tracker by updating the location of at least one of: a scale invariant feature, a scale invariant feature transform (SIFT) feature, a speeded up robust feature (SURF), a Harris corner feature, a maximally stable extremal region (MSER) feature, a color histogram, a grayscale histogram, a shape feature of the blob, an area of the blob, an orientation of the blob, an aspect ratio of the blob and a contour of the blob.

18. The video image processing apparatus of claim 10 wherein the blob processor determines if an existing tracker is associated with a location within the blob region by at least one of:
- determining if a centroid of a set of tracking features judged to correspond to a set of tracking features identified in a previously processed image frame is within a boundary of the blob region;
- determining if a selected number of tracking features of a set of tracking features judged to correspond to a set of features identified in a previously processed image frame are within a boundary of the blob region;
- determining if a selected percentage of tracking features of a set of tracking features judged to correspond to a set of features identified in a previously processed image frame are within a boundary of the blob region; and
- determining if a set of tracking features associated with the blob correspond to a set of features identified in a previously processed image frame.

\* \* \* \* \*